Aug. 16, 1938.    G. T. REICH    2,126,974
RECOVERY OF PRODUCTS OF FERMENTATION
Filed Nov. 3, 1936    2 Sheets-Sheet 1

Inventor:
Gustave T. Reich
By Potter, Pierce & Scheffler
Attorneys.

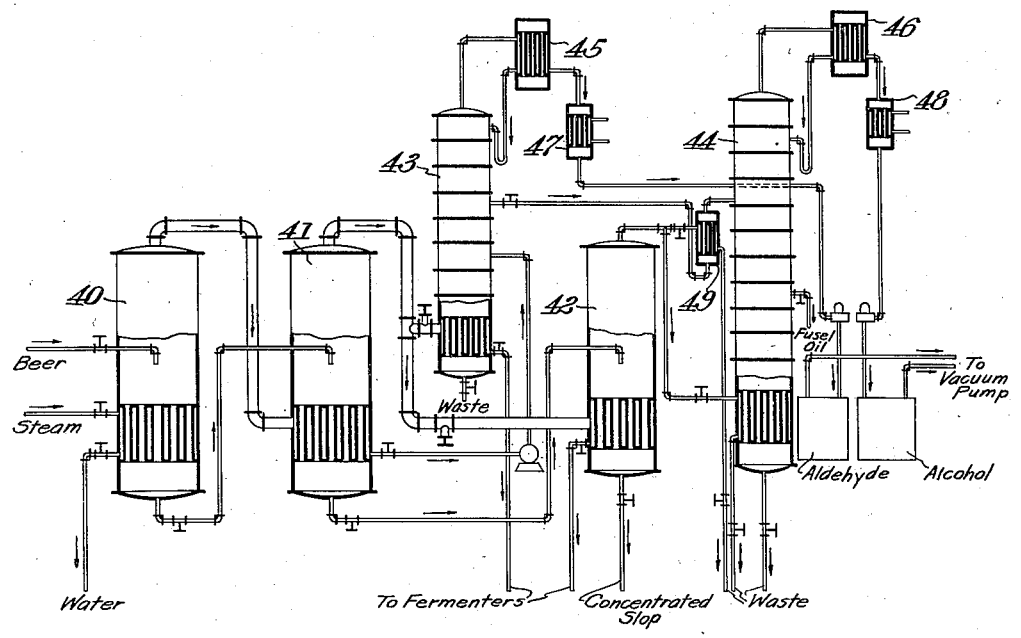

Patented Aug. 16, 1938

2,126,974

UNITED STATES PATENT OFFICE 2,126,974

RECOVERY OF PRODUCTS OF FERMENTATION

Gustave T. Reich, Philadelphia, Pa.

Application November 3, 1936, Serial No. 109,027

10 Claims. (Cl. 202—45)

This invention relates to the recovery of the products obtained by the fermentation of saccharine materials. Such materials when subjected to fermentation by means of yeasts or bacteria produce fermentation liquors, technically known as "beers", which contain valuable organic compounds, both volatile and non-volatile, and also valuable inorganic compounds. Of particular importance are the liquors produced by alcoholic fermentation and for the purpose of illustration the invention will be more particularly described with reference to such liquors.

A principal object of the present invention is the recovery of volatile products of fermentation while concentrating the non-volatile products with a minimum of heat requirements.

In my United States Patent No. 2,010,929 of August 13, 1935, I have described a method whereby the fermentation liquors are passed through a multiple effect evaporator, the vapors from the earlier effects, after being used at least in part for the heating of later effects, being passed to a rectifying column.

I have now found that still greater economies in fuel consumption and operating expenses may be effected by utilizing the vapors from the later effects for heating the rectifying columns, the latter being operated under a vacuum so as to become an integral part of the multiple effect evaporating system. By this means the invention provides methods and apparatus whereby the heat energy contained in the steam supplied to the first effect of the evaporator system is utilized to dealcoholize the beer, rectify the alcohol, and concentrate the slop.

The details of the methods of operation and arrangement of apparatus may be varied considerably according to the nature of the materials treated and the purity and concentration of the products desired as will be apparent from the various embodiments of the invention which will be described for the purpose of illustrating the principles of the invention, with particular reference to the accompanying drawings in which:

Fig. 3 is a diagrammatic representation of a further modification of the invention.

Figure 1:
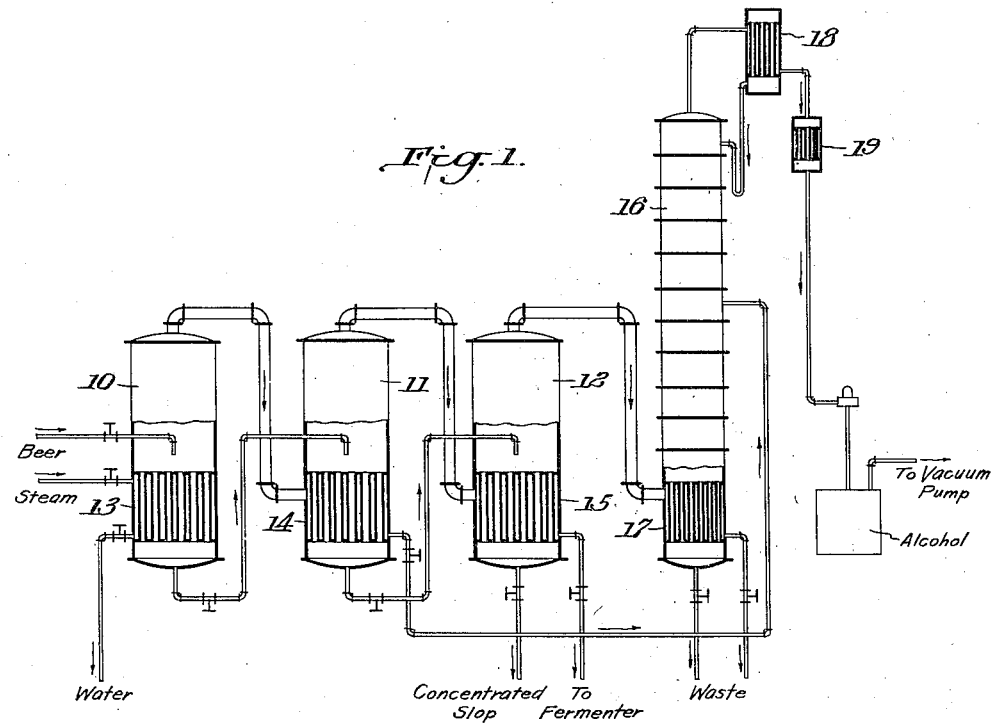
Fig. 1 is a diagrammatic representation of a simple form of the invention.

The form of the invention shown in Fig. 1 is particularly suitable for the manufacture of power alcohol as it provides a very economical method for recovering a product containing all of the combustible volatile products from the fermentation liquors. In the figure, 10, 11 and 12 are evaporators having calandrias or steam chests 13, 14, 15, while 16 is a rectifying column having a steam chest 17. The top of the rectifying column is connected to a vacuum pump, not shown, through dephlegmator 18 and condenser 19.

The beer or other fermented liquor is passed into evaporator 10, the calandria 13 of which is heated by steam. In this evaporator substantially all of the alcohol and other volatile products of fermentation are vaporized.

The liquor from evaporator 10 is passed successively into evaporators 11 and 12 where it is evaporated down to a concentrated slop. The vapors from evaporator 10 are passed into the calandria 14 of evaporator 11, where they supply the heat to carry out the evaporation of the liquor. The condensate from calandria 14 is conducted to rectifying column 16. The vapors from evaporator 11 contain all the remaining volatile organic compounds of the fermentation liquor in dilute form. After using these vapors to heat evaporator 12 the condensate is preferably used for making up fermentation batches.

The vapors from evaporator 12 contain no valuable substances and are used to heat the steam chest of rectifying column 16 and the condensate is passed to waste. In the rectifying column the volatile organic compounds in the vapors from evaporator 10 are rectified to give a concentrated alcoholic product containing the other volatile organic compounds of the fermentation liquor such as aldehydes and fusel oil. The water separated from the product is drawn off at the foot of the column to waste.

The whole system including the rectifier operates as a multiple effect apparatus, evaporators 10, 11 and 12 and rectifying column 16 operating under successively lower pressures. For example, with a vacuum of 26 inches at the head of the rectifying column, in a typical operation, the vacuum in evaporator 12 is 18 inches, that in evaporator 11 is 10 inches, and in evaporator 10 the pressure is 5 pounds.

Figure 2:
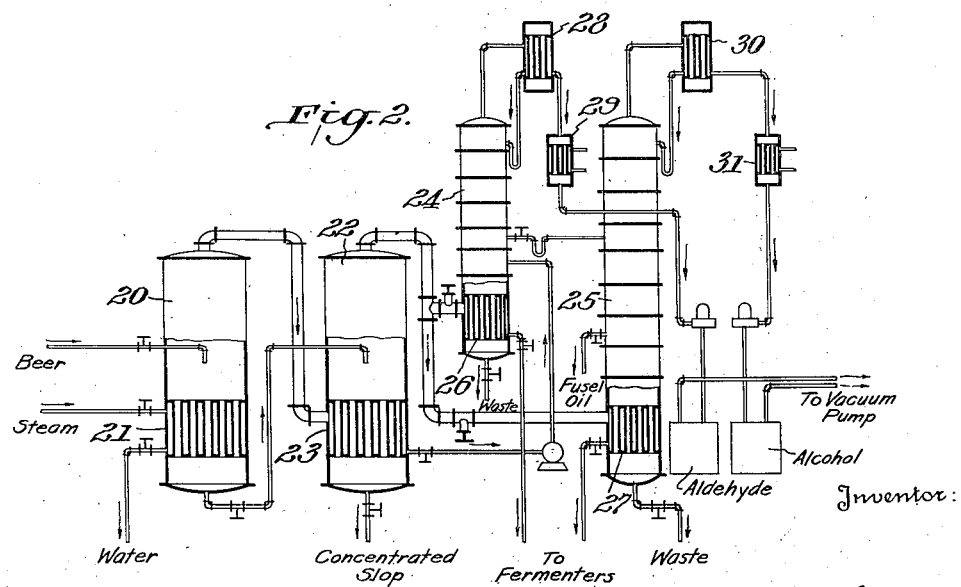
Fig. 2 is a diagrammatic representation of a modified form of the invention.

For the production of more highly rectified alcohol further modification of the apparatus is desirable as shown in Figs. 2–4.

In the apparatus illustrated in Fig. 2 two rectifying columns are operated in conjunction with two evaporators, although a larger number of evaporators may be used. Beer is fed into evaporator 20 which is heated by steam in steam chest 21. The liquor is further concentrated in evaporator 22 heated by the vapors from evaporator 20 which are passed to calandria 23. The condensate from calandria 23 is fed into rectifying column 24. Rectifying or aldehyde column 24 is operated to remove aldehydes at the head while the alcoholic fraction containing fusel oil is removed from the body of the column and fed to final rectifying column 25. In rectifying column 25 the fusel oil and water are removed from the alcohol and a highly rectified alcohol is obtained from the head of the column. Rectifying columns 24 and 25 are heated by vapors from evaporator 22 which are divided and fed to steam chests 26 and 27. The rectifying columns are operated under a vacuum from one or more vacuum pumps, not shown, connected to column 24 through dephlegmator 28 and condenser 29, and to column 25 through dephlegmator 30 and condenser 31.

In the apparatus shown in Fig. 3 two rectifying columns 43 and 44, are operated in conjunction with three evaporators, 40, 41 and 42. The aldehyde column 43 is operated with evaporator 42 as a combined third effect, while final rectifying column 44 is operated as a fourth effect.

Aldehyde column 43 and evaporator 42 are heated by the vapors from evaporator 41. The alcoholic condensate from the calandria of evaporator 41 is fed to the aldehyde column 43, while the alcohol fraction from this column is fed to final rectifying column 44. Rectifying column 44 is maintained under a vacuum by means of a vacuum pump, not shown, connected to the column through condenser 48 and dephlegmator 46. Aldehyde column 43 is maintained at under a lesser vacuum, substantially equal to that in evaporator 42, by means of a vacuum pump, not shown, connected to the column through condenser 47 and dephlegmator 45. The liquid alcoholic fraction passing from aldehyde column 43 may advantageously be vaporized before entering rectifying column 44 by heat exchange in vaporizer 49 with a portion of the vapors from evaporator 42. The alcoholic condensate entering aldehyde column 43 may also be similarly vaporized if desired.

The various arrangements of apparatus shown in the drawings are merely illustrative of the principle of the invention and are subject to considerable modification and variation in adapting the invention to different situations. They may be used in combination with various expedients for more economical operation, for example, by passing the liquid or vapor effluents from various elements of the apparatus through heat exchangers whereby the fermented liquid entering the evaporating system is preheated.

I claim:

1. A method of recovering products of fermentation from fermentation liquors which comprises introducing the liquor into the effect of a multiple effect evaporator operating under the highest pressure, heating the liquor therein to remove a substantial proportion of the volatile organic products of fermentation in vapor form, concentrating the residue from the first effect by evaporating the water content thereof in further effects operating under successively lowered temperatures, utilizing vapor from the first effect to heat indirectly a successive effect thereby condensing the same and passing that condensed vapor into a rectifying column, utilizing vapor from an effect subsequent to the first effect for indirectly heating said rectifying column, and maintaining a vacuum on said rectifying column.

2. A method of recovering products of fermentation from fermentation liquors which comprises introducing the liquor into the effect of a multiple effect evaporator operating under the highest pressure, heating the liquor therein to remove a substantial proportion of the volatile organic products of fermentation in vapor form, concentrating the residue from the first effect by evaporating the water content thereof in further effects operating under successively lowered temperatures, utilizing vapor from the first effect to heat indirectly a successive effect thereby condensing the same and passing that condensed vapor successively into a plurality of rectifying columns, utilizing vapor from an effect subsequent to the first effect for indirectly heating said rectifying columns and maintaining a vacuum on said columns.

3. A method of recovering products of fermentation from fermentation liquors which comprises introducing the liquor into the effect of a multiple effect evaporator operating under the highest pressure, heating the liquor therein to remove a substantial proportion of the volatile organic products of fermentation in vapor form, concentrating the residue from the first effect by evaporating the water content thereof in further effects operating under successively lowered temperatures, utilizing vapor from the first effect to heat indirectly a successive effect thereby condensing the same and passing that condensed vapor into a rectifying column, utilizing vapor from an effect operating under intermediate pressure to heat indirectly both said rectifying column and an evaporator operating under lowest pressure, passing a rectified fraction from said rectifying column into a second rectifying column, indirectly heating said second rectifying column with vapors from the said effect operating under lowest pressure and maintaining a vacuum on said rectifying columns.

4. A method of recovering products of fermentation from fermentation liquors which comprises introducing the liquor into the effect of a multiple effect evaporator operating under the highest pressure, heating the liquor therein to remove a substantial proportion of the volatile organic products of fermentation in vapor form, concentrating the residue from the first effect by evaporating the water content thereof in further effects operating under successively lowered temperatures, utilizing vapor from the first effect to heat indirectly a successive effect thereby condensing the same and passing that condensed vapor into a rectifying column, passing a rectified fraction from said rectifying column into a second rectifying column, indirectly heating both said rectifying columns with vapors from the effect operating under lowest pressure, and maintaining a vacuum on said rectifying columns.

5. A method of recovering products of fermentation from fermentation liquors which comprises introducing the liquor into the effect of a multiple effect evaporator operating under the highest pressure, heating the liquor therein to remove a substantial proportion of the volatile organic products of fermentation in vapor form, concentrating the residue from the first effect by evaporating the water content thereof in further effects operating under successively lowered temperatures, utilizing vapor from the first effect to heat indirectly a successive effect thereby condensing the same and passing that condensed vapor into a rectifying column, utilizing vapor from an effect operating under intermediate pressure to heat indirectly both said rectifying column and an evaporator operating under lowest pressure, passing a rectified fraction from said rectifying column into a second rectifying column, indirectly heating said second rectifying column with vapors from the said effect operating under lowest pressure and maintaining a vacuum on said rectifying columns, the vacuum on said first rectifying column being maintained substantially the same as the vacuum in said evaporator operating under lowest pressure and less than the vacuum maintained on the second rectifying column.

6. A method of recovering products of fermentation from fermentation liquors which comprises introducing the liquor into the effect of a multiple effect evaporator operating under the highest pressure, heating the liquor therein to remove a substantial proportion of the volatile organic products of fermentation in vapor form, concentrating the residue from the first effect by evaporating the water content thereof in further effects operating under successively lowered temperatures, utilizing vapor from the first effect to heat indirectly a successive effect thereby condensing the same and passing that condensed vapor into a rectifying column, passing a rectified fraction from said rectifying column into a second rectifying column, indirectly heating both said rectifying columns with vapors from the effect operating under lowest pressure, and maintaining the same vacuum on said rectifying columns.

7. A method of recovering products of fermentation from fermentation liquors which comprises introducing the liquor into the effect of a multiple effect evaporator operating under the highest pressure, heating the liquor therein to remove a substantial proportion of the volatile organic products of fermentation in vapor form, concentrating the residue from the first effect by evaporating the water content thereof in further effects operating under successively lowered temperatures, utilizing vapor from the first effect to heat indirectly a successive effect thereby condensing the same and passing that condensed vapor successively into a plurality of rectifying columns, utilizing vapor from an effect subsequent to the first effect for indirectly heating said rectifying columns and for vaporizing by indirect heating the feed to at least one of said rectifying columns, and maintaining a vacuum on said columns.

8. A method of recovering volatile constituents of liquid mixtures which comprises heating the liquid to vaporize a substantial proportion of the volatile constituents thereof and utilizing the heat of condensation of said vaporized volatile constituents to effect the rectification of condensed volatile constituents by indirect heat exchange with the condensed volatile constituents under a pressure lower than the pressure of the vaporized volatile constituents.

9. A method of recovering volatile constituents of liquid mixtures which comprises introducing the liquid mixture into still, heating the liquid therein to remove a substantial proportion of the volatile constituents thereof, utilizing the vapor from said still to heat indirectly a still operating under lower pressure thereby condensing the same and rectifying that condensed vapor in a still operating under lower pressure than the first named still and indirectly heated by vapors from a still operating under higher pressure than the rectifying still.

10. A method of recovering volatile constituents of liquid mixtures which comprises introducing the liquid mixture into a still, heating the liquid therein to remove a substantial proportion of the volatile constituents thereof, utilizing the vapor from said still to heat indirectly a still operating under lower pressure thereby condensing the same and rectifying that condensed vapor in a plurality of stills operating under lower pressure than the first named still and indirectly heated by vapors from a still operating under higher pressure than the rectifying stills.

GUSTAVE T. REICH.